(12) United States Patent
Brown

(10) Patent No.: US 12,547,744 B2
(45) Date of Patent: Feb. 10, 2026

(54) CONTROLLING ACCESS TO A DEMOUNTABLE STORAGE DEVICE

(71) Applicant: Fortinet, Inc., Sunnyvale, CA (US)

(72) Inventor: Alan Brown, Brentford (GB)

(73) Assignee: Fortinet, Inc., Sunnyvale, CA (US)

( * ) Notice: Subject to any disclaimer, the term of this patent is extended or adjusted under 35 U.S.C. 154(b) by 380 days.

(21) Appl. No.: 18/117,886

(22) Filed: Mar. 6, 2023

(65) Prior Publication Data

US 2024/0220642 A1    Jul. 4, 2024

(30) Foreign Application Priority Data

Jan. 4, 2023   (GB) ..................................... 2300113

(51) Int. Cl.
*G06F 21/60* (2013.01)
*G06F 3/06* (2006.01)

(52) U.S. Cl.
CPC .......... *G06F 21/604* (2013.01); *G06F 3/0622* (2013.01); *G06F 3/0653* (2013.01); *G06F 3/0673* (2013.01)

(58) Field of Classification Search
CPC .... G06F 3/0622; G06F 3/0653; G06F 3/0673; G06F 21/604
See application file for complete search history.

(56) References Cited

U.S. PATENT DOCUMENTS

2005/0216717 A1* 9/2005 Wong .................... G06F 9/4413
713/1
2006/0101522 A1   5/2006 Rothwell et al.
(Continued)

OTHER PUBLICATIONS

"Search Report under Section 17(5)", issued by the Intellectual Property Office of the United Kingdom for counterpart application No. GB2300113.4 on Jul. 1, 2024, 3 pages.
(Continued)

*Primary Examiner* — Dhairya A Patel
(74) *Attorney, Agent, or Firm* — Jaffery Watson Hamilton & DeSanctis LLP

(57) ABSTRACT

Described herein is a data carrier storing program code for causing one or more processors of a data processing system to perform the following steps to control access to a demountable storage device: issue a command to the system to prevent the mounting of at least some demountable storage devices so as to be accessible to applications comprised in a set of user space applications running on the data processing system; establish a software entity for controlling access to a demountable storage device; detect the coupling of the demountable storage device to the data processing system, and cause the demountable storage device to be mounted such that it is accessible by the software entity but not by the applications comprised in the set of user space applications running on the data processing system; issue a command to the system to advertise to one or more of the applications comprised in the set of user space applications running on the data processing system the software entity as a means of accessing a simulated storage device; receive from a user space application of the one or more of the applications comprised in the set of use space applications a request to access the simulated storage device; apply one or more predefined criteria to determine whether to block the request; and if the request is determined to be not blocked, execute by means of the software entity an access to the demountable storage device.

20 Claims, 3 Drawing Sheets

(56) References Cited

U.S. PATENT DOCUMENTS

| | | | | |
|---|---|---|---|---|
| 2011/0302330 A1* | 12/2011 | Cota-Robles | ........... | G06F 9/468 |
| | | | | 710/14 |
| 2013/0055044 A1* | 2/2013 | Eljezovic | ............ | G06F 11/1004 |
| | | | | 714/E11.044 |
| 2017/0308492 A1* | 10/2017 | Vajravel | ................ | G06F 9/4411 |
| 2022/0075884 A1* | 3/2022 | Hildreth | ................ | G06F 21/554 |
| 2025/0138958 A1* | 5/2025 | Desai | .................... | G06F 21/602 |

OTHER PUBLICATIONS

"Symantec Data Loss Prevention Help Center 16.0", htttps://techdocs.broadcom.com/us/en/symantec-security-software/information-security/data-loss-prevention/16-0/about-discovering-and-preventing-data-loss-on-endp-v98548126-d294e27/dlp-agent-version-15-8-feature-level-support/about-dlp-agent-feature-level-support-v117302903-d294e17185/mac-agent-monitoring-support-v115961002-d294e17831/mac-agent-removable-storage-features-v115965098-d294e18017.html, Jan. 25, 2023; pp. 1-2039.

* cited by examiner

CONTROLLING ACCESS TO A DEMOUNTABLE STORAGE DEVICE

CROSS-REFERENCE TO RELATED APPLICATIONS

This application claims priority to G.B. Patent Application No. 2300113.4, filed Jan. 4, 2023, titled "Controlling Access To A Demountable Storage Device," the entirety of which is hereby incorporated by reference.

FIELD OF THE INVENTION

This invention relates to endpoint security, in particular to protecting against data exfiltration.

BACKGROUND

Organizations implementing networks of computing devices may have cyber security solutions in place, including firewalls, network security appliances and antivirus solutions. However, such measures cannot necessarily manage insider risks. Intentional, or unintentional but damaging, actions by users of computing devices in a network can be a serious vulnerability to organizations that traditional tools may not be able to defend against.

A core capability within the Data Loss Prevention (DLP) industry is being able to block sensitive data from being exfiltrated. As data can be transferred through different channels, prevention measures are needed for each of these channels to stop sensitive files from being exfiltrated.

One common exfiltration channel is mass storage devices, such as memory sticks that can be mounted to the Universal Serial Bus (USB) of a computing device. Users may transfer sensitive documents to a USB stick, which may then be used for purposes that may harm an organization.

The mechanisms that are available in a computer to resist exfiltration of files over USB will depend on the operating system the computer is running. For example, some operating systems may offer direct calls whereby a supervisory application can oversee attempts by other applications to save data to a USB device. This can provide a straightforward mechanism to resist exfiltration. However, designers of operating systems may view it as undesirable to make a call of this type available because it may present a security risk: an untrusted entity might gain access to the call. For this reason, some operating systems are designed to greatly restrict the access of one application to file operations of other applications. For example, recent versions of the macOS operating system have tightly controlled system extensions which make it challenging to resist exfiltration.

Taking macOS as an example, some DLP tools are addressing this challenge by using the system extensions to prevent file copies to the demountable storage device (for example, using the Finder user interface) based on sensitivity labels, or using app-specific context to prevent a sensitive file from being written as to the demountable storage device. A difficulty of this approach is that it requires files to be provided with suitable labels, or extensive content filters to be defined. Also, a malicious user might be able to alter a file's labels or obscure its content and thereby prevent the file being caught by such a system.

It is desirable to develop a method for preventing data exfiltration that overcomes at least some of the above-identified issues.

SUMMARY

According to one aspect there is provided a data carrier storing program code for causing one or more processors of a data processing system to perform the following steps to control access to a demountable storage device: issue a command to the system to prevent the mounting of at least some demountable storage devices so as to be accessible to applications comprised in a set of user space applications running on the data processing system; establish a software entity for controlling access to a demountable storage device; detect the coupling of the demountable storage device to the data processing system, and cause the demountable storage device to be mounted such that it is accessible by the software entity but not by the applications comprised in the set of user space applications running on the data processing system; issue a command to the system to advertise to one or more of the applications comprised in the set of user space applications running on the data processing system the software entity as a means of accessing a simulated storage device; receive from a user space application of the one or more of the applications comprised in the set of user space applications a request to access the simulated storage device; apply one or more predefined criteria to determine whether to block the request; and if the request is determined to be not blocked, execute by means of the software entity an access to the demountable storage device.

The program code may be configured to execute the access to the demountable storage device so as to mimic the received request to access the simulated storage device.

The request to access the simulated storage device may comprise a request to write a file saved at a memory associated with the data processing system to the demountable storage device. The request may be a request to copy or move the file.

If the request is determined to be not blocked, the data carrier may be configured to cause the one or more processors to save the file to the demountable storage device.

In response to the request to write the file, the program code may cause the one or more processors to save the file at an intermediate memory space associated with the data processing system and accessible to the software entity but not to the applications comprised in the set of user space applications running on the data processing system.

The program code may cause the one or more processors to inform the user space application that the request to write the file to the removable storage device is being processed prior to determining whether to block the request.

The one or more predefined criteria may be criteria for one or more attributes of the file, the one or more attributes comprising one or more of a content of a file or a part thereof and metadata of the file.

The metadata may comprise one or more Microsoft Purview Information Protection labels.

The program code may cause the one or more processors to modify an extension of the file with information indicating the outcome of the determination. For example, the extension may be an Encapsulated PostScript extension.

Regardless of the outcome of the determination, the program code may cause the one or more processors to block the request if the removable storage device does not have sufficient available memory to save the file.

The program code may cause the one or more processors to determine whether to block the request in dependence one or more data exfiltration policies.

If the request is determined to be blocked, the program code may cause the one or more processors to deny by means of the software entity an access to the demountable storage device.

The program code may cause the one or more processors to prevent the mounting of the at least some demountable storage devices via a disk arbitration framework.

In response to receiving a DARegisterDiskMountApprovalCallback function, the program code may cause the one or more processors to issue a command to the system to return a negative result so as to prevent the demountable storage device from automatically mounting to the data processing system.

The program code may cause the one or more processors to assign a file provider domain for the demountable storage device.

The program code may cause the one or more processors to create a location for the file provider domain corresponding to a virtual file system path space that the demountable storage device is to be mounted in.

The program code may cause the one or more processors to issue a command to the system to prevent direct access by the user to the demountable storage device.

The program code may cause the one or more processors to maintain a record of the outcome of the determination for one or more requests.

The data processing system may be one of a desktop computer, a laptop computer, a tablet, a mobile phone and a server computer.

The demountable storage device may be a USB stick.

The operating system of the data processing system may be macOS.

The data carrier may store the program code in non-transient form.

The software entity may be an agent. The software entity may be a user space application. The software entity may not be one of the set of user space applications.

According to a second aspect there is provided a method for controlling access to a demountable storage device from a data processing system, the method comprising: issuing a command to the system to prevent the mounting of at least some demountable storage devices so as to be accessible to applications comprised in a set of user space applications running on the data processing system; establishing a software entity for controlling access to a demountable storage device; detecting the coupling of the demountable storage device to the data processing system, and cause the demountable storage device to be mounted such that it is accessible by the software entity but not by the applications comprised in the set of user space applications running on the data processing system; issuing a command to the system to advertise to one or more of the applications comprised in the set of user space applications running on the data processing system the software entity as a means of accessing a simulated storage device; receiving from a user space application of the one or more of the applications comprised in the set of user space applications a request to access the simulated storage device; applying one or more predefined criteria to determine whether to block the request; and if the request is determined to be not blocked, executing by means of the software entity an access to the demountable storage device.

According to another aspect, there is provided a computer program which, when executed by a computing device, causes the computing device to perform the method described above.

According to a further aspect there is provided a data carrier storing in non-transient form the computer program described above.

BRIEF DESCRIPTION OF THE FIGURES

The present invention will now be described by way of example with reference to the accompanying drawings.

In the Drawings.

DETAILED DESCRIPTION

Figure 1:
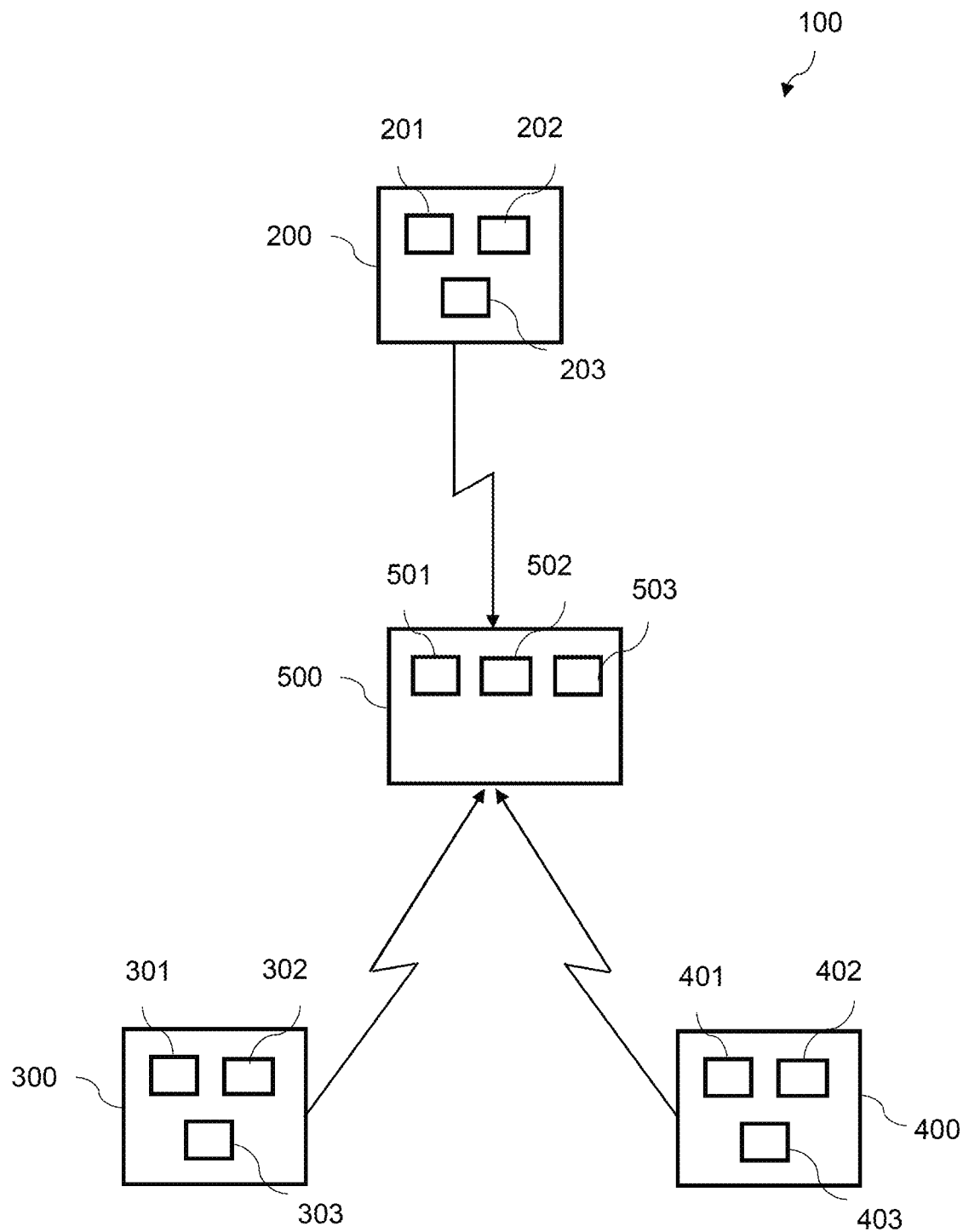
FIG. 1 schematically illustrates a network of computing devices.

FIG. 1 schematically illustrates a network 100 comprising multiple data processing systems. In this example, the data processing systems are computing devices 200, 300, 400. Each computing device may be, for example, a desktop computer, laptop computer, tablet, mobile phone and/or server computer or a combination thereof. Other suitable computing devices may also be implemented in such a network. The devices may be connected in the network by wired and/or wireless connections. The network may, for example, be a corporate network. Access to the network may be restricted, for example by security devices that filter traffic at the boundary of the network. The network may interface via such security devices to a publicly accessible network such as the internet.

Computing devices 200, 300, 400 each comprise a processor 201, 301, 401 and a memory 202, 302, 402. The processor 201, 301, 401 may be implemented as dedicated hardware. Alternatively, the processor 201, 301 401 may be implemented as a computer program running on a programmable device such as a central processing unit (CPU). The respective memory 202, 302, 402 is arranged to communicate with the respective processor 201, 301, 401. Memory 202, 302, 402 may be a non-volatile memory. Each device 200, 300, 400 may comprise more than one processor and more than one memory. The memory may store data that is executable by the processor. By executing program code contained in such data, the one or more processors may perform functions as described herein. The memory may store such program code in a non-transitory manner. The processor may be configured to operate in accordance with a computer program stored in non-transitory form on a machine readable storage medium. The computer program may store instructions for causing the processor to perform its methods in the manner described herein.

Each computing device 200, 300, 400 can support a local software entity or agent. The software entity is able to collect information relating to the computing device and/or a user thereof. There may be one or more users authenticated to the computing device 200. The computing device supports the agent by storing and executing program code which, when executed, implements the agent. In this example the agent is a software entity. The agent may be implemented by one or more principal processors of the computing device, which processor(s) also implement functions of the computing device that implement the computing device's core functions. For example, if the computing device is a desktop computer, its core functions may include sending and receiving email and performing word processing tasks. Thus the principal processors may divide their time between implementing the agent and implementing other functions. Alternatively a dedicated processor may implement the agent.

The agent may be implemented as a user space application program. As used herein, user space applications are applications running in the user space, which is the memory area and a hardware privilege level of a data processing system where, for example, application software and some drivers may execute. The user space may be a limited part of the total memory of the data processing system (e.g. computing device). A user space application may have a corresponding user interface (UI) whereby a user can interact with the application. For example, the user may provide input to the application via the UI. In contrast to user space, kernel space (or supervisor mode) is memory area and hardware privilege level of the data processing system reserved for running an operating system kernel.

In addition to implementing the agent, the computing device may also implement other user space applications. The computing device may implement a set of user space applications that are not the agent. Thus, the set of user space applications does not comprise the software entity implementing the agent. The set may comprise one or more applications.

Each device 200, 300, 400 may also comprise a transceiver 203, 303, 403 which allows the respective device to communicate with a central infrastructure apparatus 500.

Central infrastructure apparatus 500 also comprises a processor 501, a memory 502 and a transceiver 503. Processor 501 and memory 502 may operate as described above with reference to processor 201 and memory 202. The apparatus 500 may comprise more than one processor and more than one memory. Transceiver 503 may send or receive data to or from the transceivers 203, 303, 403 of any of the computing devices 200, 300, 400 in the network. The apparatus 500 may be communicatively coupled to a user interface which can, for example, allow a user of the apparatus 500 to specify particular settings relating to the security of files.

Each computing device 200, 300, 400 may receive information, such as security policies, from the apparatus 500. Each computing device 200, 300, 400 may also receive updates to the software entity that implements the agent from the central infrastructure apparatus 500. Each computing device 200, 300, 400 may also send information to the apparatus 500.

The computing devices 200, 300, 400 may implement different operating systems. In the examples described herein, a computing device implements the macOS operating system. However, devices may use other operating systems, such as Windows or Linux.

As described above, it may be desirable for the agent to prevent files from being written (for example, moved or copied) to demountable storage devices. The agent may do this by evaluating a file that a user requests to write to the demountable storage device and conditionally preventing the operation from completing, as will be described in more detail below.

One example of a demountable storage device is a mass storage device that is connectable to the universal serial bus (USB) port of a computing device, commonly referred to as a USB stick.

Figure 2:
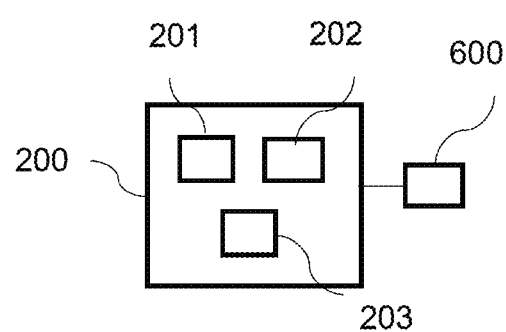
FIG. 2 schematically illustrates a computing device connected to a demountable storage device.

In the example shown in FIG. 2, a demountable storage device, for example a USB stick 600, is inserted into a USB port of computing device 200. The USB stick may comprise a processor and memory that may operate as described above with reference to processor 201 and memory 202.

Computing device 200 implements a software entity in the form of an agent which controls access to the demountable storage device 600. The computing device 200 may be configured, by the software entity or otherwise, to prevent the automatic mounting of demountable storage devices.

In one example, the agent can issue a command to the system to prevent at least some (and in some implementations, all) demountable storage devices from being mounted in such as a way to be accessible to applications comprised in a set of user space application running on the data processing system. In other words, the command prevents mounting in the usual way (where, in the usual way, the demountable storage devices are directly accessible to the applications comprised in the set of user space applications running on the data processing system).

When the agent detects the coupling of the demountable storage device 600 to the computing device 200, it can cause the demountable storage device to be mounted such that it is accessible by the software entity (the agent) but is not accessible by the applications comprised in the set of user space applications running on the computing device 200. Therefore the user may not directly access the demountable storage device 600. This can prevent the user from moving or copying a file to the demountable storage device. The software entity (the agent) may access the demountable storage device. The user may not observe the demountable storage device in a user interface, such as the Finder in macOS. The agent may prevent the demountable storage device from appearing in Open/Save dialog boxes. Instead, the agent may cause the computing device to advertise to user space applications running on the computing device the software entity as a means of accessing a simulated storage device, as will be described in more detail below.

The approach described herein may be implemented in any operating system that provides suitable access to the agent. One example of such an operating system is macOS 13.0.1. In one implementation, the agent may implement its supervision of file transfers in accordance with the Disk Arbitration (DA) framework in macOS (see https://developer.apple.com/documentation/diskarbitration for example). The DiskArbitration framework can be used to monitor and trap removable device mounts. For example, a device can be prevented from mounting using a DARegisterDiskMountApprovalCallback function (see e.g. https://developer.apple.com/documentation/diskarbitration/1492762-daregisterdiskmountapprovalcallb). The agent's implementation of this function may use this callback to discover information pertaining to the demountable storage device via the DADisk and return a negative result to prevent the mount from proceeding. The demountable storage device can then be mounted manually via the DA framework. The demountable storage device may be mounted to the computing device via the DA framework using a nobrowse option. As described above, this may mean that the demountable storage device does not appear in other user space applications running on the computing device 200, such as the Finder UI of macOS.

The agent may therefore manually mount the destination storage device via a Disk Arbitration framework, for example using a nobrowse option. The agent may, on receiving a DARegisterDiskMountApprovalCallback function, return a negative result so as to prevent the demountable storage device from automatically mounting to the computing device.

To prevent the mounted storage device 600 from being manipulated by processes which are not the agent, an Endpoint Security application programming interface (EPS) extension can prevent processes from reading or writing the region of the virtual file system (VFS) path space that the storage device 600 is mounted in. The agent can create its own version of the/Volumes directory normally maintained by DA and the automounter.

Once the automatic mounting of the demountable storage device has been prevented and the demountable storage device 600 is mounted to the computing device 200 such that it is accessible by the software entity but not by the set of user space applications running on the computing device, a command can be issued to the system to advertise to one or more of the set of user space applications running on the computing device the software entity as a means of accessing a simulated storage device. A command may be issued to the system to advertise to the set of user space applications running on the computing device the software entity as a means of accessing a simulated storage device.

The simulated storage device may be advertised to the other user space applications (i.e. the set of user space applications that are not the agent) running on the data processing system rather than the demountable storage device. For example, the simulated storage device may be displayed in a user interface rather than the demountable storage device. The simulated storage device may be given a name that is displayed on the user interface that replicates a name of the demountable storage device. This may allow a user to believe that they are requesting access to the demountable storage device, when in fact they are requesting access to the simulated storage device. The simulated storage device can therefore impersonate the true demountable storage device. The simulated storage device may correspond to an intermediate memory space associated with the computing device, as described in more detail below.

The computing device may receive from a user space application of the set of other user space applications that are not the software entity implementing the agent a request to access the simulated storage device (which the user may believe to be a request to access the true demountable storage device). For example, a user of the computing device 200 can request to move or copy a file saved at a memory associated with the computing device 200 (for example, saved to the hard disk in memory 202, or in a cloud memory accessible by the computing device 200) to the simulated storage device.

When the user requests to access the simulated storage device, for example by using a 'Save As' functionality, or by dragging and dropping a file to an icon corresponding to the simulated storage device advertised in the user interface, the file can be written to an intermediate memory space associated with the computing device. The intermediate memory space is preferably on-disk (for example, in memory 202) at the computing device 200. Alternatively, the intermediate memory space could be at a cloud memory or external server accessible to the computing device 200. In some implementations, the operating system kernel may direct the file to a location corresponding to the intermediate memory space.

The agent may not inform the user that the file is being written to the intermediate memory space. It may appear to the user that the file is being written to the demountable storage device.

In one example where the operating system of the computing device is macOS, the File Provider application programming interface (API) (see, for example, https://developer.apple.com/documentation/fileprovider) can create named domains which can be advertised as disk-like entities in user space applications running on the computing device, such as the Finder UI and Open/Save dialog boxes. A location can also be created in the virtual file system (VFS) path space, which can be compatible with Portable Operating System for UNIX (POSIX) tools, therefore shell scripts and such can continue to function when the software entity (agent) interposes itself between the user and the demountable storage device.

The agent can create an appropriately named File Provider domain for each demountable storage device observed and present this to the user as a respective simulated storage device. The File Provider service can then accept files that a user has requested to copy to, or save to, the simulated storage device. The user can interact with the File Provider domain for the simulated storage device, for example in the Finder UI.

The agent may therefore assign a File Provider domain for the demountable storage device. The agent may cause the file to be written to the File Provider domain. The agent may create a location for the File Provider domain corresponding to a virtual file system path space that the removable storage device is to be mounted in.

Instead of assigning a domain for each demountable storage device, the agent could instead vend a single domain containing directories for each demountable storage device.

Once the file is written to the intermediate memory space, such as to a File Provider domain, the agent can perform an evaluation of the file to determine whether the request should be blocked or allowed (i.e. not blocked). The evaluation may be performed while the file is saved at the intermediate space. The file may be temporarily saved at the intermediate memory space while the evaluation is being performed. The file may be deleted from the intermediate memory space once the evaluation has been performed.

The agent may evaluate the file, or one or more attributes thereof, and determine whether the request is to be blocked based on the evaluation. The agent can determine whether to block or allow (i.e. not block) the request based on one or more attributes of the file. The one or more attributes of the file may comprise one or more of a content of a file (or a part thereof), file name, file type and metadata of the file. The metadata may comprise one or more Mircrosoft Purview Info Protection (MIP) labels. The metadata may comprise one or more extended attributes, which may be involved in codesigning activities.

The evaluation involves one or more predefined criteria being applied to determine whether to block the request or allow (i.e. not block) the request. The one or more attributes of a file that are to be blocked may be configured accordingly in advance. One or more attributes of the file may be pre-classified as to be blocked. The determination of whether to block or not block the request may comprise reviewing the attributes of the file and determining, in dependence on the one or more predefined criteria, whether the request should be blocked or not blocked (for example whether the move or copy operation should proceed).

The one or more predefined criteria may be defined in one or more security policies. The security policies may be data exfiltration policies. The agent may determine whether to block the request in dependence on the one or more security policies. Policies are configurable rules that can be used to determine whether the request to access the demountable storage device is to be blocked, or whether the request is to be allowed (i.e. not blocked). Policies may specify one or more particular attributes of the file, for example, file content or a part thereof, properties or characteristics of the file (such as file type, file name etc), or metadata associated with the file. Requests to move or copy a file containing one or more of these attributes defined in a policy to a demountable storage device may be blocked. The policies may be received by the agent implemented at the computing device 200 from the central infrastructure apparatus 500.

The user may be able to input to the central infrastructure 500 information relating to the predefined criteria. A user may be able to specify one or more attributes of a file that are to be blocked. For example, a user may specify that any Word or pdf documents containing specified keywords (for example "patent") are to be blocked. The user may provide input to the apparatus 500 via a user interface to specify the attributes of a file that are to be blocked.

Therefore, in response to a user request to access the demountable storage device, for example to move or copy a file saved at a memory associated with the computing device to the demountable storage device, the agent can evaluate one or more attributes of the file at the intermediate memory space (for example, a File Provider domain). In dependence on the evaluation, the agent can prevent the file from being written to the demountable storage device (i.e. block the request).

The agent may inform the user that the request to access the demountable storage device is being processed while writing the file to the intermediate memory space and/or performing the evaluation to determine whether the request should be blocked, or not blocked.

If the agent determines that the request is to be allowed (i.e. not blocked), the agent can allow access to the demountable storage device. If the request for access to the demountable storage device is determined by the agent to be allowable (i.e. not blocked), the file can be forwarded and written to a memory space of the demountable storage device. In the case of a move or copy file request, the agent allows the file to be written to the demountable storage device 600 to complete the move or copy operation.

This approach can also preserve file metadata. For example, on macOS this can include extended attributes, since these are involved in codesigning activities.

The agent may execute the access to the demountable storage device so as to mimic the received request to access the simulated storage device. Therefore, it may appear to the user that the access is being executed to the simulated storage device advertised in the user space application (which they believe to be the demountable storage device).

If the request is blocked, the agent may inform the user that the request has failed. Regardless of the outcome of the evaluation, the agent may inform the user that the request has failed if the demountable storage device does not have sufficient available memory to save the file.

The agent at computing device 200 may keep a record of the outcome of the evaluation for one or more files and may share the record with the central infrastructure apparatus 500 and/or other data processing systems in the network, such as computing devices 300, 400.

Once the outcome of a request is known, an extension of the relevant file (for example, the EPS extension) may be modified with information indicating the outcome. The computing device 200 can send back information to the central infrastructure apparatus 500 indicating which files have been blocked. The apparatus 500 can distribute information which allows other computing devices in the network, such as devices 300 and 400 to also block these files, for example by updating one or more policies that are then distributed to the devices in the network 100. This may further assist in preventing multiple users from exfiltrating the same file.

Therefore, as in the File Provider case domains are generally per-user, the EPS extension can create a record of files that have been allowed and files that have been blocked. Attempts to start manipulating the same file by another user/File Provider can also be blocked. The EPS extension is particularly suitable for this purpose, because it already has Full Disk Access, Transparency Consent and Controls (TCC) permissions and runs as the root user.

It should be noted that the access request (e.g. file move or copy operation) could fail at a later stage, for example if the user removes the USB stick before the access request has completed, or if there is insufficient storage at the demountable storage device to save the file.

The program may maintain the graphical user experience of a user saving or moving a file (which may be especially relevant for large files). The system may present a UI that helps the user understand that the computing device is acting on a file, and that although the save, or copy operation has apparently completed, the file is not necessarily on the demountable storage device. There may conveniently be some affordances provided in the Finder and Open/Save dialog boxes where items can be badged. In the event that the agent blocks the request, the agent may provide the user with a way to access the file, so that if it were sent from a volatile context, such as an unsaved document, the data is not lost. Since the agent essentially accepts responsibility for the file once it has been written to the intermediate memory space, if the agent runs into problems completing further operations (as discussed above, if the request is determined to be unallowable or if the memory of the demountable storage device is full), the agent may output the file to a recovery area. This may be advantageous if, for example, the user had modified the file before requesting to save it to the demountable storage device and did not save the updated file to the memory associated with the computing device first. This can ensure that the changes made to the file are not lost and can be saved to the memory associated with the computing device.

This solution may therefore manage the user experience by making the user of the computing device aware when a request is allowed or blocked, and if the operation succeeds or fails. Success in this case success means that the request to access to the demountable storage device has been allowed (not blocked) and the file has been written to the demountable storage device successfully.

Under normal circumstances, when a user has moved or copied a file to a demountable storage device, a user may eject the demountable storage device via a user space application running on the computing device, for example using the 'eject' button via the Finder in macOS, or other user space applications for other operating system. Since in the approach described herein the agent traps the mount and prevents the demountable storage device from appearing in user interfaces of user space applications running on the computing device (for example, the Finder), an alternative means of beginning this process may be provided.

The agent may maintain a list of the demountable storage devices it is managing. This also interacts with the arbitration mechanism described above (for example, the agent cannot eject a device and then later copy a file to it). The agent could emulate an 'eject menu' similar to that which can be found in/System/Library/Core Service/Menu Items so that the user interface is a familiar experience for the user. In some implementations, a dialog may appear when the demountable storage device is mounted, which can be dismissed, and also provide an option not to appear again (by a per user-preference).

The agent may cause the ongoing state of an access request to be serialised to on-disk memory (e.g. memory 202 of computing device 200) in such a way that if one or more processes crashes while the agent owns the user's file data, then the agent can resume from where it left off.

Since in some implementations File Providers belong to the user session, there is the possibility that the user session ends while the agent is evaluating the file in the intermediate memory space, before writing it to the demountable storage device (if the user request is not blocked). In one implementation, the agent may prevent the ejection of a demountable storage device until a user logs back in and the evaluation can be completed.

It can be useful for the agent to be able to inhibit other programs from establishing a file provider for a demountable storage device. This can avoid such an other program from bypassing the agent's supervision of file transfers to the demountable storage device. In some operating systems, it may be possible for the agent to register with the operating system in such a way as to prevent other programs from establishing file providers. In other operating systems, the agent may be able to adopt other measures, for example detecting that another program has established a file provider for a demountable storage device and in response to detecting that event, blocking access at the device level to such a demountable storage device. Other measures may be possible in operating systems having different capabilities.

Figure 3:
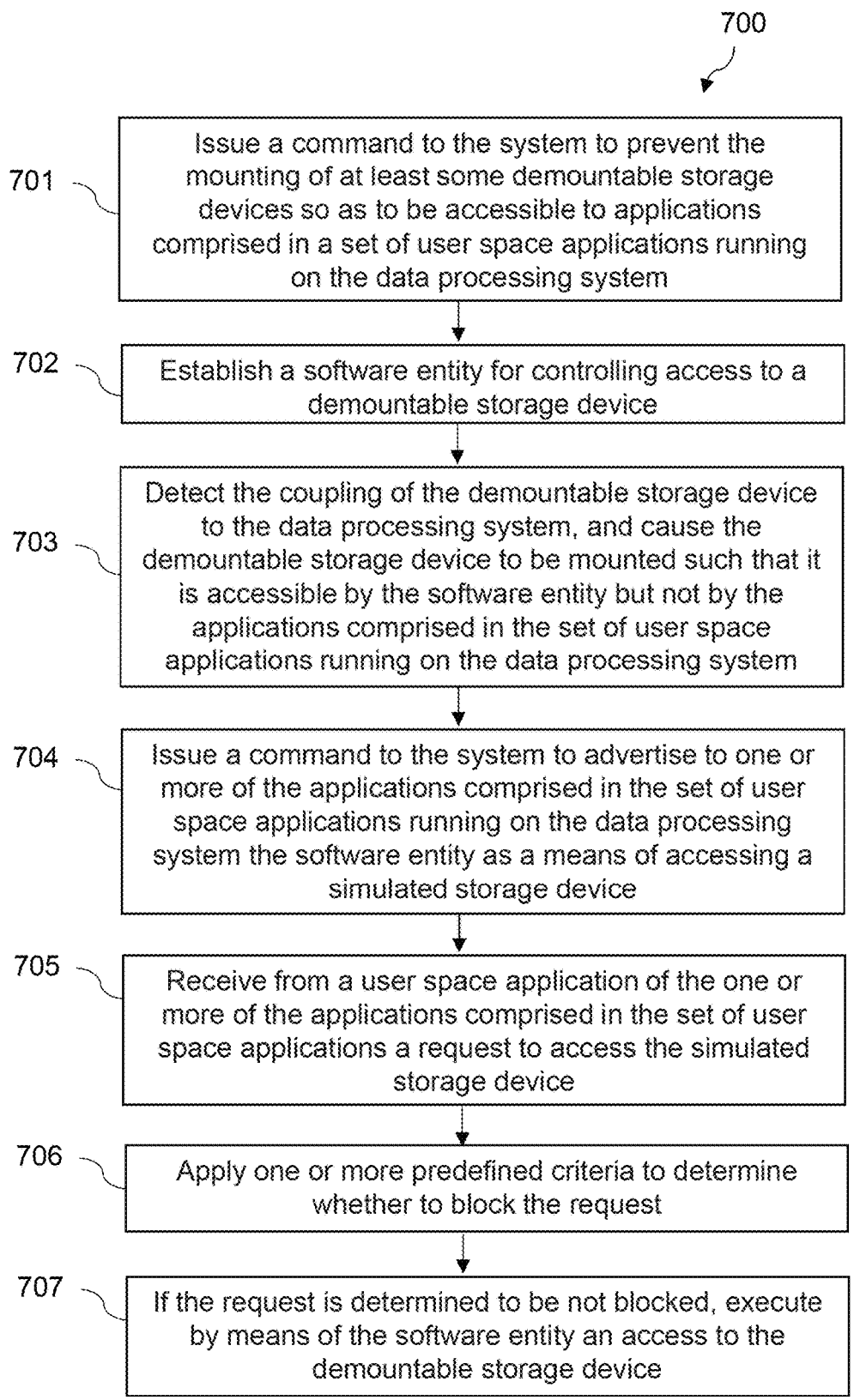
FIG. 3 shows an example of a method for controlling access to a demountable storage device.

FIG. 3 shows an example of a method 700 for controlling access to a demountable storage device from a data processing system. At step 701, the method comprises issuing a command to the system to prevent the mounting of at least some demountable storage devices so as to be accessible to applications comprised in a set of user space applications running on the data processing system. At step 702, the method comprises establishing a software entity for controlling access to a demountable storage device. At step 703, the method comprises detecting the coupling of the demountable storage device to the data processing system, and cause the demountable storage device to be mounted such that it is accessible by the software entity but not by the applications comprised in the set of user space applications running on the data processing system. At step 704, the method comprises issuing a command to the system to advertise to one or more of the applications comprised in the set of user space applications running on the data processing system the software entity as a means of accessing a simulated storage device. At step 705, the method comprises receiving from a user space application of the one or more of the applications comprised in the set of user space applications a request to access the simulated storage device. At step 706, the method comprises applying one or more predefined criteria to determine whether to block the request. At step 707, the method comprises, if the request is determined to be not blocked, executing by means of the software entity an access to the demountable storage device.

The approach described herein advantageously allows the software agent to prevent sensitive files from being exfiltrated to demountable storage devices, which may cause significant harm to an organization.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A non-transitory computer readable medium having stored thereon program code for causing one or more processors of a data processing system to control access to a demountable storage device, the one or more processors to:
issue a command to the system to prevent the mounting of at least some demountable storage devices so as to be accessible to applications comprised in a set of user space applications running on the data processing system;
establish a software entity for controlling access to a demountable storage device;
detect the coupling of the demountable storage device to the data processing system, and cause the demountable storage device to be mounted such that it is accessible by the software entity but not by the applications comprised in the set of user space applications running on the data processing system;
issue a command to the system to advertise to one or more of the applications comprised in the set of user space applications running on the data processing system the software entity as a means of accessing a simulated storage device;
receive from a user space application of the one or more of the applications comprised in the set of user space applications a request to access the simulated storage device;
apply one or more predefined criteria to determine whether to block the request; and
if the request is determined to be not blocked, execute by means of the software entity an access to the demountable storage device.

2. The non-transitory computer readable medium as claimed in claim 1, wherein the program code is configured to execute the access to the demountable storage device so as to mimic the received request to access the simulated storage device.

3. The non-transitory computer readable medium as claimed in claim 1, wherein the request to access the simulated storage device comprises a request to write a file saved at a memory associated with the data processing system to the demountable storage device.

4. The non-transitory computer readable medium as claimed in claim 3, wherein if the request is determined to be not blocked, the data carrier is configured to cause the one or more processors to save the file to the demountable storage device.

5. The non-transitory computer readable medium as claimed in claim 3, wherein in response to the request to write the file, the program code causes the one or more processors to save the file at an intermediate memory space associated with the data processing system and accessible to the software entity but not to the applications comprised in the set of user space applications running on the data processing system.

6. The non-transitory computer readable medium as claimed in claim 3, wherein the one or more predefined criteria are criteria for one or more attributes of the file, the one or more attributes comprising one or more of a content of a file or a part thereof and metadata of the file.

7. The non-transitory computer readable medium as claimed in claim 3, wherein the program code causes the one or more processors to modify an extension of the file with information indicating the outcome of the determination.

8. The non-transitory computer readable medium as claimed in claim 3, wherein regardless of the outcome of the determination, the program code causes the one or more processors to block the request if the removable storage device does not have sufficient available memory to save the file.

9. The non-transitory computer readable medium as claimed in claim 1, wherein the program code causes the one or more processors to determine whether to block the request in dependence one or more data exfiltration policies.

10. The non-transitory computer readable medium as claimed in claim 1, wherein if the request is determined to be blocked, the program code causes the one or more processors to deny by means of the software entity an access to the demountable storage device.

11. The non-transitory computer readable medium as claimed in claim 1, wherein the program code causes the one or more processors to prevent the mounting of the at least some demountable storage devices via a disk arbitration framework.

12. The non-transitory computer readable medium as claimed in claim 11, wherein in response DARegisterDiskMountApprovalCallback function, the program code causes the one or more processors to issue a command to the system to return a negative result so as to prevent the demountable storage device from automatically mounting to the data processing system.

13. The non-transitory computer readable medium as claimed in claim 1, wherein the program code causes the one or more processors to assign a file provider domain for the demountable storage device.

14. The non-transitory computer readable medium as claimed in claim 1, wherein the program code causes the one or more processors to issue a command to the system to prevent direct access by the user to the demountable storage device.

15. The non-transitory computer readable medium as claimed in claim 1, wherein the program code causes the one or more processors to maintain a record of the outcome of the determination for one or more requests.

16. A method for controlling access to a demountable storage device from a data processing system, the method comprising:
    issuing a command to the system to prevent the mounting of at least some demountable storage devices so as to be accessible to applications comprised in a set of user space applications running on the data processing system;
    establishing a software entity for controlling access to a demountable storage device;
    detecting the coupling of the demountable storage device to the data processing system, and cause the demountable storage device to be mounted such that it is accessible by the software entity but not by the applications comprised in the set of user space applications running on the data processing system;
    issuing a command to the system to advertise to one or more of the applications comprised in the set of user space applications running on the data processing system the software entity as a means of accessing a simulated storage device;
    receiving from a user space application of the one or more of the applications comprised in the set of user space applications a request to access the simulated storage device;
    applying one or more predefined criteria to determine whether to block the request; and
    if the request is determined to be not blocked, executing by means of the software entity an access to the demountable storage device.

17. The method of claim 16, wherein the request to access the simulated storage device comprises a request to write a file saved at a memory associated with the data processing system to the demountable storage device.

18. The method of claim 16, wherein the request to access the simulated storage device comprises a request to write a file saved at a memory associated with the data processing system to the demountable storage device.

19. The method of claim 16, wherein the one or more predefined criteria are criteria for one or more attributes of the file, the one or more attributes comprising one or more of a content of a file or a part thereof and metadata of the file.

20. The method of claim 16, wherein if the request is determined to be blocked, deny by means of the software entity an access to the demountable storage device.

* * * * *